Nov. 5, 1929.                    C. M. CRAM                    1,734,614
                                 TOOL CHUCK
                            Filed Aug. 15, 1927
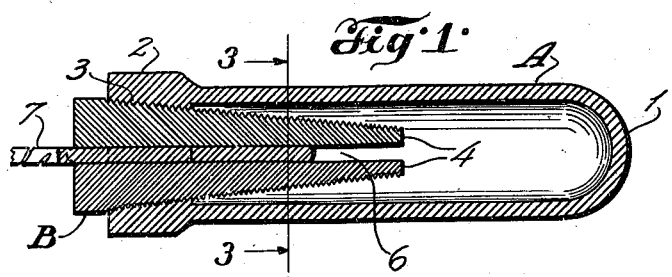
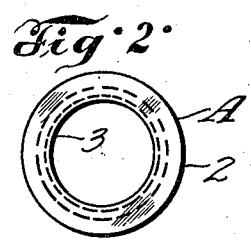
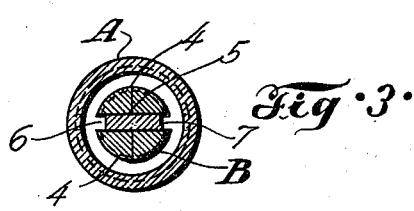
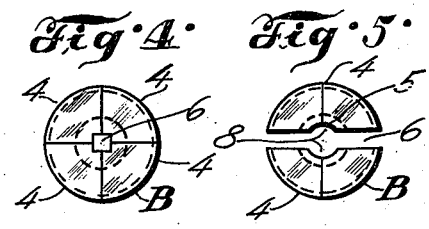
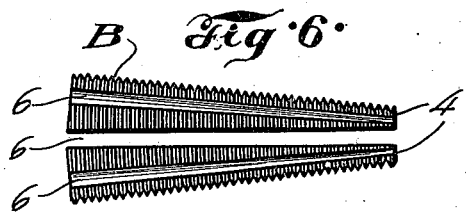
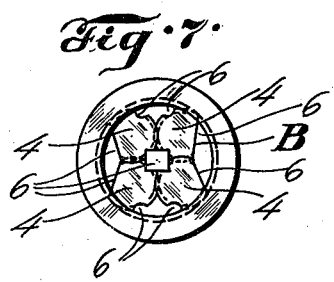
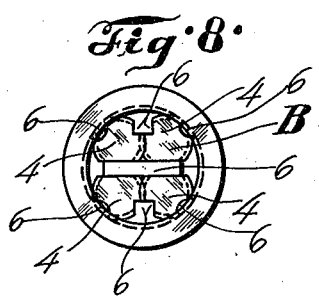
Inventor
Caraola M. Cram
By Adam E. Fisher
Attorney Patented Nov. 5, 1929

1,734,614

UNITED STATES PATENT OFFICE

CARAOLA M. CRAM, OF SPRINGFIELD, VERMONT

TOOL CHUCK

Application filed August 15, 1927. Serial No. 212,857.

This invention relates to a new and useful improvement in chucks for holding tools, such as drills, chisels, screw-drivers, augers, and the like, and has particular reference to such a chuck adapted for use in hand tools, such as are now customarily supplied with integral handles, which are apt to get broken or otherwise rendered unfit for use, thus impairing the usefulness of the tool.

I am aware that tool holders have been placed upon the market providing for means for holding various tools, and I do not broadly claim such a structure, but my object is to provide a simple and effective chuck for such uses, the said chuck being adapted to receive different forms of jaws assembly to suit the character of tool inserted therein.

Another object is to provide a chuck having a removable jaw assembly, the jaws thereof being constructed with a plurality of tool engaging faces, and the jaws being further adapted for insertion in the chuck in different co-operative relationships for the purpose of receiving various shapes and forms of tools.

A further object is to provide said jaws and the assembly thereof in a form integrally combining the tool engaging means and the adjusting means co-operating with the chuck for clasping the jaws on the tool. In the present form of construction for chucks, the tool engaging means are usually separate and distinct from the clasping means, the said tool engaging means consisting of tapered or inclined planes coacting with various means for drawing the tool engaging means upon the inclined planes for the purpose of contracting or expanding the same. In my invention, I combine these functions into one element or group of elements as will hereinafter be described.

With the above and other objects in view, as will appear during the course of the following description, my invention consists in the combination and arrangement of parts hereinafter described and claimed, and more particularly illustrated in the accompanying drawings, wherein, Figure 1 is a medial longitudinal sectional view through a chuck embodying my invention.

Figure 2 is an end view of Figure 1 the jaws being omitted.

Figure 3 is a sectional view along the line 3—3 of Figure 1.

Figure 4 is an end view of a jaw assembly for use with square shank tools.

Figure 5 is an end view of a jaw assembly for use with flat or round shank tools.

Figure 6 is a side elevation of a reversible jaw assembly, the chuck housing being removed.

Figure 7 is an end view of Figure 6 as inserted in the housing for use with square shank tools.

Figure 8 is an end view similar to Figure 7, showing the jaws reversed for use with flat shank tools; and Figure 9 is an end view of one of the jaws.

Referring now more particularly to the drawings, I provide a tubular chuck or housing A, closed at one end as at 1, and having at the other end an enlarged hub portion 2, interiorly and helically threaded as at 3 for the reception of a unitary frusto-conical jaw assembly B comprising a plurality of complementary jaws 4, each jaw being quadrantal in cross-section and the assembly B as a whole being exteriorly and helically threaded and adapted to engage the threaded hub portion 2, the inner faces 5 of the said jaws 4 being chambered as at 6 for the reception of the tool 7, therein between, as shown in Figure 3, wherein is shown a tool 7 having a flat shank held in the chuck; in Figure 4 is shown a jaw assembly having said chambers 6 formed suitably to accommodate therein-between a tool having a square shank; and in Figure 5 is shown a modified form of the said chambers 6 similar to those shown in Figure 3 but also provided with a semi-circular extension as shown at 8, to receive a tool having a round shank.

It will be seen, that, in order to hold the tool in the chuck, means must be provided for expanding the jaws 4 for the insertion of the tool thereinbetween and for contracting the jaws upon the tool for firmly holding or clasping the tool in the chuck. Heretofore, such means have been separate from, but co-operative with, the jaws, but in my invention, by the novel construction now to be described, I combine these functions in the jaw assembly B, as by providing the jaws 4 in their assembled relation in a frusto-conical shape, the interior of the hub 2 being formed complementary to the jaws, the periphery of the jaws and the interior face of the hub being co-operatively threaded with a thread having a constant pitch but varying diameter. It will be seen that by rotating the jaw assembly B so as to cause the same to enter the hub, the jaws 4 will be contracted upon each other into co-operative relationship, thus firmly engaging the tool, while if the jaws be rotated so as to be withdrawn from the hub, they may be expanded from each other, thus permitting the insertion or withdrawal of the tool.

In the foregoing I have described a chuck having a removable jaw assembly B, wherein I have provided a plurality of said jaw assemblies each being adapted to accommodate a different form of tool, but in Figures 6 to 9, inclusive, I illustrate such a jaw assembly B wherein are embodied, in one assembly, means for accommodating the different forms of tools, as by providing a plurality of frusto-conical jaws 4, each jaw being helically threaded with a thread of constant pitch but varying diameter, the jaws 4 as comprised in the assembly B thereof together presenting a substantially frusto-conical longitudinal outline, the threads on the jaws being engaged by the threads in the hub to a greater or less extent, the arc of contact of said threads being governed by the relative position of the jaws in the hub. It will be seen that, as the jaws are withdrawn from the hub, the arc of contact diminishes, but there will always be sufficient contact to serve the purpose of my invention, which is to cause the jaws to be clamped on the tool positioned between them. A plurality of chambers 6 are provided in each of the jaws 4, three such chambers being shown in the embodiment illustrated, each chamber being shaped to accommodate one form of tool, as, for example, a square tool as shown in Figure 7, or a flat tool, as shown in Figure 8, or a round tool. These chambers 6 extend longitudinally of the jaw, the chambers, of course, serving to break the continuity of the threads on the jaw.

In use, the tool having been inserted between the jaws, the asembly is inserted into the hub of the housing, and rotated so as to enter into the same, whereupon, by reason of the helical threads on the frusto-conical assembly B of the jaws, the same are contracted firmly upon the tool, while a reverse motion will serve to expand the jaws from the tool.

Thus it will be seen that I provide a simple and effective chuck for the purpose as described, easily and cheaply manufactured, and readily applied to the use intended.

While I have herein described a certain specific method of constructing and assembling the elements of my invention, it is understood same may be varied in minor details, not departing from the spirit of my invention as defined in the appended claims.

I claim:

1. A tool chuck, comprising, in combination, an interiorly threaded tubular housing, and a plurality of like coactingly arranged jaws, each jaw having a frusto-conical shape and also a spiral thread, a portion of the thread on each jaw engaging the thread in the housing, and other portions of the thread on each jaw engaging the like threads on the adjacent jaws, each jaw further having a plurality of longitudinal chambers, said chambers interrupting the threads on the jaw, and the several jaws being adapted for arrangement in the housing for presenting like chambers in registration to form a tool shank holder.

2. A tool chuck, comprising, in combination, a tubular housing having an interior spiral thread, and a plurality of like coactingly arranged frusto-conical jaws endwise presented with their smaller ends in the housing, each jaw having a spiral thread, a portion of the thread on each jaw engaging a portion of the thread in the housing, and other portions of the thread on each jaw engaging the like threads on the adjacent jaws, the other portions of the thread on each jaw being interrupted by a plurality of longitudinal chambers in the periphery of the jaw, each chamber in each jaw being formed complementary to like chambers in the other jaws, and the several jaws being adapted for arrangement in the housing to present like chambers in centrally disposed registration to form a tool receptive chamber therebetween, the assembly as a whole being adapted to be threaded into said housing for gripping a tool shank in the tool receptive chamber.

In testimony whereof I affix my signature.

CARAOLA M. CRAM.